Dec. 5, 1939.  H. N. WHEELER  2,181,930

FOOT MEASURING MACHINE

Filed Aug. 10, 1937  5 Sheets-Sheet 2

INVENTOR
*Harry N. Wheeler*
BY *Sager & Malcolm*
ATTORNEYS

Dec. 5, 1939.   H. N. WHEELER   2,181,930
FOOT MEASURING MACHINE
Filed Aug. 10, 1937   5 Sheets-Sheet 3

INVENTOR
HARRY N. WHEELER
BY Sager & Malcolm
ATTORNEYS

Patented Dec. 5, 1939

2,181,930

UNITED STATES PATENT OFFICE 2,181,930

FOOT MEASURING MACHINE

Harry N. Wheeler, Birmingham, Ala., assignor to Wheeler-Morse Company, Birmingham, Ala., a corporation of Delaware Application August 10, 1937, Serial No. 158,298

21 Claims. (Cl. 33—3)

This invention relates to a foot measuring machine for use in shoe stores or elsewhere and has for its object to provide a simple, dependable apparatus for instantly and accurately measuring the foot without inconvenience or special effort on the part of the user.

An important feature of the invention resides in the provision of an improved mechanism for measuring the length and width of the foot with a minimum number of adjustments and with greater accuracy than has been possible in the past. The measuring mechanism includes length and width gages which are movable in unison in a predetermined relationship for measuring the length of the foot while maintaining the width gage at a predetermined position relative to the length gage during the length setting; after which the width gage may be adjusted independently for making the width measurement.

For example, the machine disclosed herein for purposes of illustration is adapted to measure foot lengths up to size "15" and widths up to size "3E." The machine may be initially set to this maximum length "15" and to a given width such as "E" by a simple adjustment. A customer requiring a size "5-C" shoe, for example, will place his foot on the machine and, by a simple longitudinal movement of the length gage as hereinafter described, the length measuring mechanism is instantly adjusted to the proper size, in this case to size "5." During this length adjustment, furthermore, the width gage is also moved automatically and in definite relationship to the length gage so that it always registers the maximum width which varies from "E" to "3E" for a reason hereinafter described. At the conclusion of this operation a further simple adjustment, as by means of a hand lever, independently moves the width gage to the proper setting, which, in the stated case, is width "C." The length and width appear side by side on index scales which are conveniently mounted in the base of the apparatus; and at the conclusion of the measuring operation the parts may be automatically returned to the initial setting.

An important advantage of the above construction and method of operation is that the automatic adjustment of the width gage together with the length gage, to compensate for differences in actual linear width measurements for various foot sizes, simplifies the subsequent independent adjustment of the width gage. If the customer happens to require a size "5-D" shoe, for example, or some other narrow width, the length measurement will be taken by making the longitudinal adjustment to size "5", the width gage being simultaneously adjusted to a width "3E", after which the width gage is independently moved the short distance necessary to reach the "D" or other narrower width required by the customer. Such independent adjustment of the width gage from the "3E" setting of a size "5" foot requires a comparatively small movement and results in a substantial saving in time and effort by the operator.

The invention also provides improved means for determining the proper size of shoe for feet having various configurations. This mechanism includes a gage which takes into account the position of the ball of the foot as well as the over-all length of the foot itself. In this way irregularities in the form of the foot are compensated for and the proper size of shoe is assured under all conditions.

In the preferred form of the invention the mechanism is mounted in a flat housing or platform which is rotatably mounted on a stool of the type commonly used in shoe stores. This platform or housing is so arranged and combined with the stool that one side forms a foot rest for use in trying on shoes, while the other side carries the length and width gages for measuring the feet. The index scales operated by the measuring mechanism are so arranged that they are visible from either side of the platform and may be observed by the salesman during the measuring operation as well as when the platform is reversed to form a foot rest.

These and other features and advantages of the invention will be described in connection with a particular embodiment shown in the accompanying drawings, in which.

Figures 1, 2, 12, 13, 14, 15:
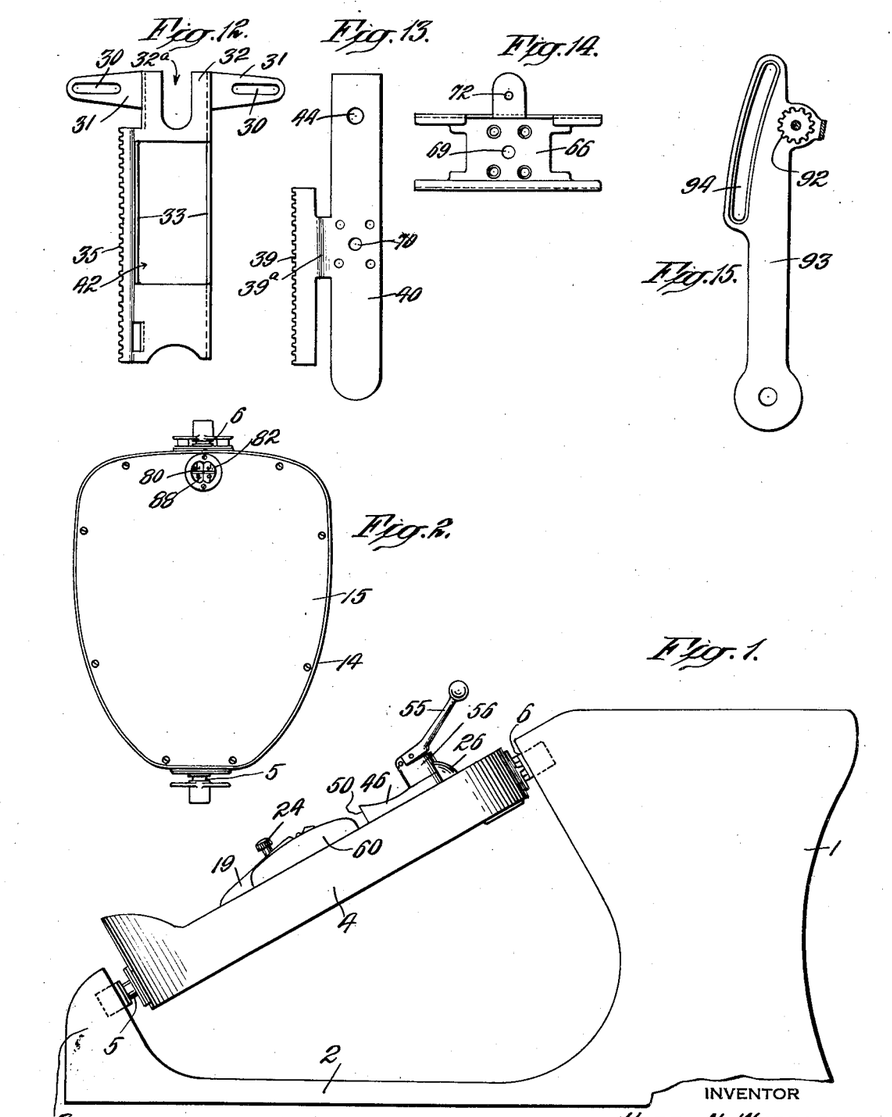
Fig. 1 is a side elevation of a combined foot measuring machine and stool constructed in accordance with the invention.
Fig. 2 is a bottom plan view of the measuring device.
Fig. 12 is a detail view of the toe gage plate forming part of the adjusting mechanism.
Fig. 13 is a detail view of the slide ratchet plate.
Fig. 14 is a detail view of the support for the width gage plates.
Fig. 15 is a detail view of the arm carrying the width gage pinion.

In the drawings, Fig. 1 shows a combined foot measuring device, foot rest and stool comprising a pedestal 1 mounted on base 2 having a lower end portion or extension 3. The flat housing or platform 4, constituting the foot measuring device and foot rest, is pivoted between the extension 3 and the upper part of the pedestal 1 as by pins 5 and 6, respectively, which are carried by said housing and are rotatably mounted in suitable bearings in the stool.

The pivot pin 6 at the upper end of the pedestal 1 is provided with a transverse notch 7 in which a catch 8, carried by the pedestal 1, is adapted to seat for locking the platform in position. The platform is normally held with the catch 8 in engagement with the notch 7 by means of a spring 9 seated in a recess 10 formed in a bushing 11 attached to the pedestal 1 and bearing against a cup 12 in the pin 5. This construction normally holds the platform 4 either in foot measuring or foot rest position. In the position shown in Fig. 1 the platform 4 is in position for measuring the feet. After the measurement has been obtained in a manner to be set forth, the platform 4 is reversed to bring the foot rest into operative position, as indicated in Fig. 2. This is accomplished by the attendant pushing the entire platform downwardly against the tension of the spring 9, thereby releasing the notch 7 to permit a free rotation of the platform about the axis of the pins 5 and 6. After 180° rotation the spring 9 agains causes the notch 7 to seat against the catch 8 for locking the machine in position.

The measuring machine housing or platform 4 comprises a frame 14 which carries the measuring mechanism hereinafter described, and is closed on one side by a cover plate 15 which forms a foot rest when the measuring machine is in the position shown in Fig. 2. The frame 14 also carries a top plate 18 which supports the foot measuring mechanism hereinafter described.

Figure 3:
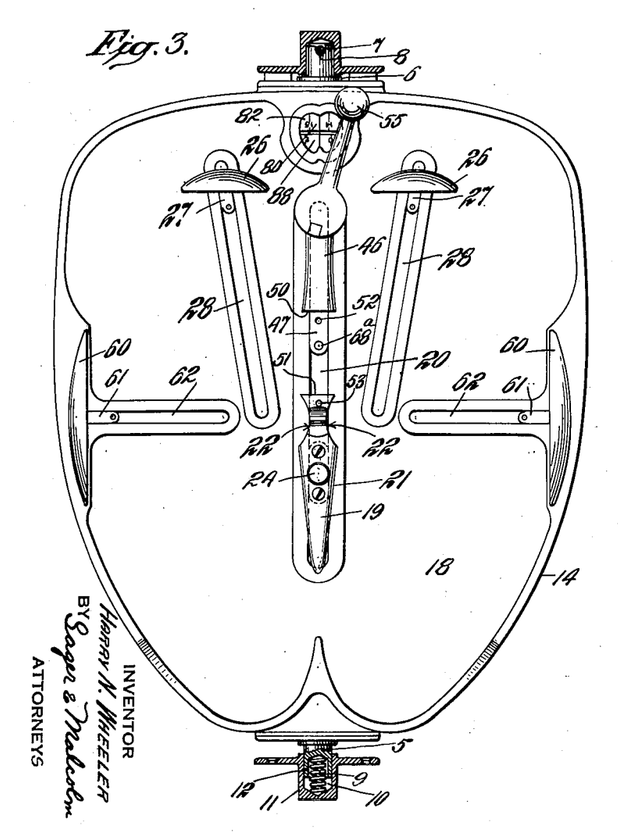
Fig. 3 is a top plan view thereof.
Figure 9:
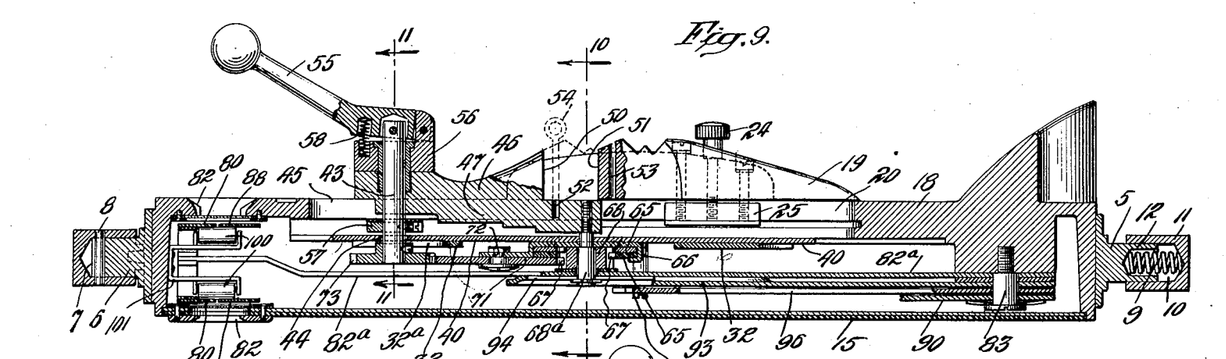
Fig. 9 is a longitudinal section taken on line 9—9 of Fig. 3.
Figure 10:
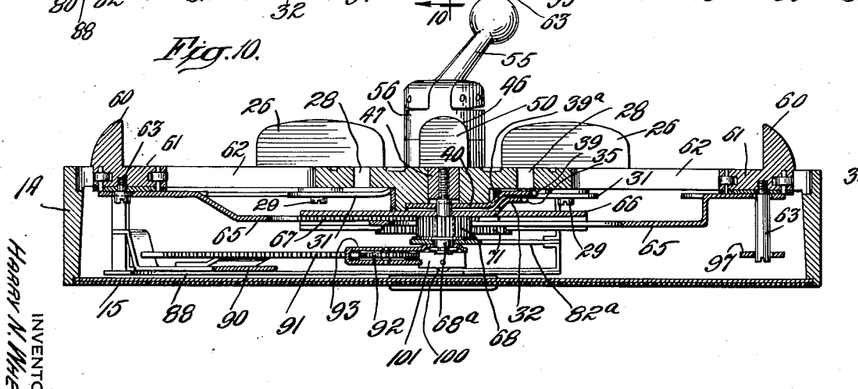
Fig. 10 is a transverse section taken on line 10—10 of Fig. 9.

The measuring mechanism comprises a center gage 19 (Figs. 3 and 9) mounted for sliding movement in a longitudinal slot 20 in the top plate 18. This center gage 19 is provided with inclined surfaces 21 (Fig. 3) which are adapted to engage the sides of the feet during the measuring operation. The gage 19 is also provided with recesses 22 which are adapted to register with the main joints of the large toes adjacent the balls of the feet for indicating the correct shoe size. A plate 25 (Fig. 9) is secured to gage 19 beneath the top plate 18 to form a guide and retaining means for guiding the gage 19 in its movement in the slot 20. A set screw 24 may be mounted in the gage 19 to adjustably hold the plate 25 so as to permit the gage 19 to be clamped in any desired position or to be released for sliding movement along the slot 20.

A pair of toe gages 26 are mounted on blocks 27 which slide in inclined slots 28 in the top plate 18.

Figure 7:
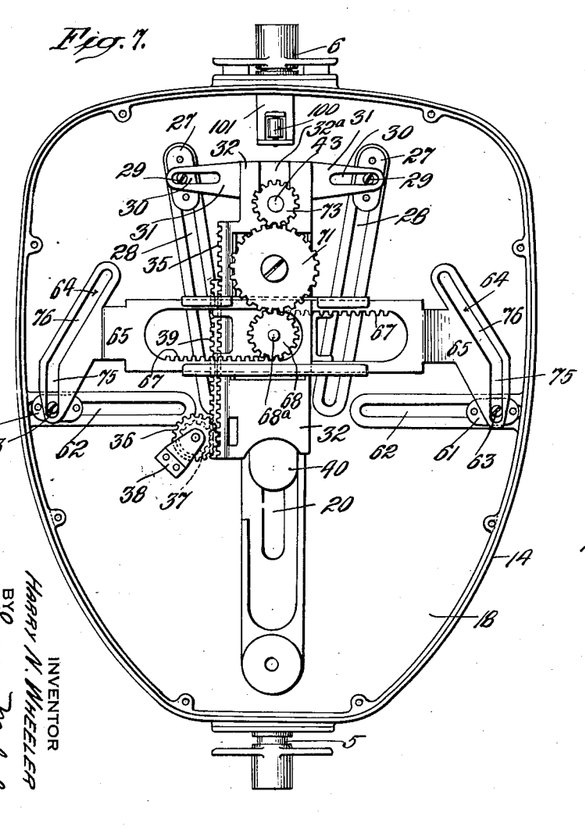
Figs. 7 and 8 are views similar to Figs. 4 and 6, respectively, but with the index brackets removed.
Figure 11:
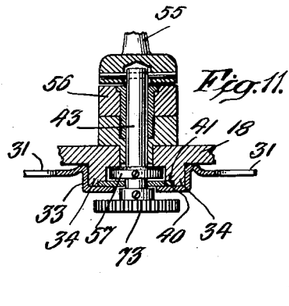
Fig. 11 is a detail section of the adjusting mechanism, taken on line 11—11 of Fig. 9.

The slots 28 are so arranged that the toe gages are in proper position for registering the length of shoe for feet of various sizes. The blocks 27 carry pins 29 which engage slots 30 in ears 31 formed on a toe gage plate 32 (Fig. 12). The toe gage plate 32 is provided with a central channel section 33 (Fig. 11) which is adapted to seat over bosses 34 formed on the top plate 18 to permit relative movement of said toe gage plate. The toe gage plate carries a rack 35 registering with pinion 36 (Fig. 7) which is mounted in fixed relation to a pinion 37 by means of a stationary bracket 38. The pinion 37 engages a rack 39 carried by an arm 39a attached to a slide ratchet plate 40 (Fig. 13) which is slidably held in a recess 41 in the top plate 18 (Fig. 11) with the arm 39a extending through a recess 42 in the toe gage plate 32. The slide ratchet plate 40 carries a pin 43 (Fig. 9) which passes through an aperture 44 in said plate through a slot 32a in the plate 32 and through a slot 45 in said top plate 18. The pin 43 is journaled in a slide 46 which is mounted for sliding movement in the slot 20 in the top plate 18 and is provided with a bottom flange 47 by means of which the slide 46 is slidably held in said slot. The slide 46 is provided with a shoulder 50 which is adapted to engage a shoulder 51 formed on the center gage 19 for limiting the movement of the slide 46. The flange 47 is provided with an aperture 52 which registers with an aperture 53 in the center gage 19 when the shoulders 50 and 51 are in contact. The gage 19 and the slide 46 may be locked in this position by a pin 54 so that when the set screw 24 is released they may be operated in unison if desired.

The pin 43 is secured to a handle 55 which is pivotally mounted on a bushing 56 carried by the slide 46 and is adapted to cause rotational movement of the pin 43 and also to cause slight axial movement thereof. The pin 43 carries a washer 57 which is adapted to seat against the underside of the top plate 18 for locking these parts in position. When the pin 43 is depressed axially by corresponding movement of the handle 55 the washer 57 is released from the top plate 18 and thereby permits sliding movement of slide 46 as well as rotational movement of the pin 43. A spring 58 normally holds the handle 55 in its upper position, with the washer 57 locked against the top plate 18.

It will be noted that by means of the mechanism thus far described, sliding movement of the slide 46 caused by actuation of the handle 55 produces a corresponding sliding movement of the toe gage plate 32 and of the toe gages 26 which are actuated thereby. The ratio between the pinions 36 and 37 is such that the movement of the slide 46 and of the toe gages 26 are in the ratio of 17 to 24, which ratio corresponds to the relation between the total length of a normal foot and the distance between the ball of the foot and the heel.

A pair of width gages 60 are mounted on blocks 61 which are slidable in slots 62 formed in the top plate 18. The blocks 61 carry pins 63 which are slidable in slots 64 in width gage plates 65 which are slidably mounted for transverse movement in guide plate 66 (Fig. 14) attached to the slide ratchet plate 40. The width gage plates 65 are provided with racks 67 meshing with the opposite sides of a gear 68, mounted on a pin 68a which extends through an aperture 69 in the guide plate 66 and an aperture 70 in the slide ratchet plate 40 and is carried by the slide 46. The gear 68 meshes with an idler gear 71 journaled in an aperture 72 in the guide plate 66 and meshing with a gear 73 carried by the pin 43 so that rotation of the pin 43 produced by the handle 55, causes the width gage plates 65 to be extended or retracted, thereby causing a corresponding movement of the width gages 60 for measuring the width of the feet.

Figure 8:
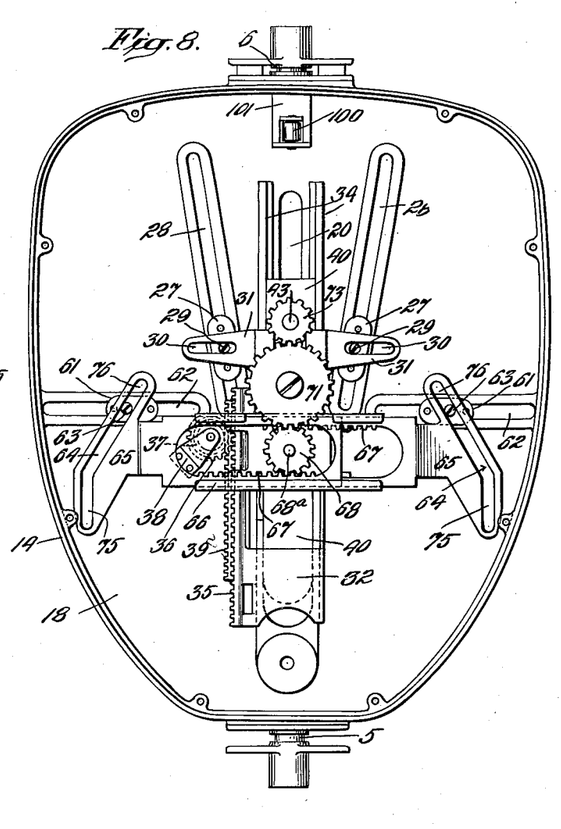

It will be noted that the slots 64 in the width gage plates 65 are provided with straight sections 75 and with inclined sections 76. It will be further noted that as the width gage plates 65 are moved longitudinally of the platform in response to sliding movement of the slide 46, the pins 63, controlling the width gages 60, first remain stationary until the inclined sections 76 of the slot 64 are reached and thereafter are moved inwardly. The inclination of the sections 76 of the slots 64 is such that the width gages 60 assume a position corresponding to a definite width of foot for each setting of the toe gages 26. For example, the width gages may be caused to remain at the setting corresponding to the width "3E" for the different foot lengths. In the form shown the lower portion of the slot 64 is made straight as indicated at 75 due to the limitations in width of the machine and further because it is unlikely that the machine would be required to measure a foot of a maximum width of "3E" in the longer sizes such as sizes 10 to 14. The maximum setting of the width gages may correspond, for example, to a width "E" for a setting corresponding to the length 15. This same setting of the gages may correspond to a width "3E" for a setting corresponding to a length 10. Thereafter the width gages are moved inwardly as the length is reduced to maintain a setting corresponding to this width "3E." It is to be understood that after the length measurement has been obtained the width gages are further moved inwardly by rotation of the handle 55 to effect the necessary width measurements. This rotation of the handle 55 operates through the gear 68 and the rack 67 to retract the width gage plates 65 to the position shown for example in Fig. 8 which is the final measuring position.

For giving a visible indication of the length measurement there is provided a pair of index plates 80 carrying scales 81 which are visible through apertures 82 formed in the top plate 18 and the cover plate 15. These index plates 80 are carried on a bracket 82a which is pivoted to a pin 83 carried by the top plate 18. The bracket 82a is provided with a slot 84 which is engaged by the pin 68a carried by the slide 46. The shape of the slot 84 is such that the longitudinal movement of the pin 68a causes a pivotal movement of the bracket 82a such that the index designation on the scales 81 correspond to the length setting of the toe gages 26.

For indicating the width of foot a pair of index plates 88 are provided carrying index scales 89 which are visible through the apertures 82 in the top plate 18 and the cover plate 15. The index plates 88 are carried by a bracket 90 which is pivoted to the pin 83 and carries a circular rack 91 meshing with a pinion 92 carried on an arm 93 which is likewise pivoted about the pin 83. The arm 93 is provided with a slot 94 which is engaged by the pin 68a and causes a pivotal movement of the arm 93 for purposes to be described. The pinion 92 meshes with a circular rack 95 carried on an arm 96 which is pivoted about the pin 83 and is provided with an ear 97 having a slot 98 formed therein which is engaged by a pin 63 associated with a width gage 60. The pin 63 causes pivotal movement of the arm 96 corresponding to the changes in setting of the width gage 60. A pair of rollers 100 (Fig. 9) mounted on brackets 101 may guide the index plates 80 and 88 and hold the same in position adjacent the openings 82.

Figure 4:
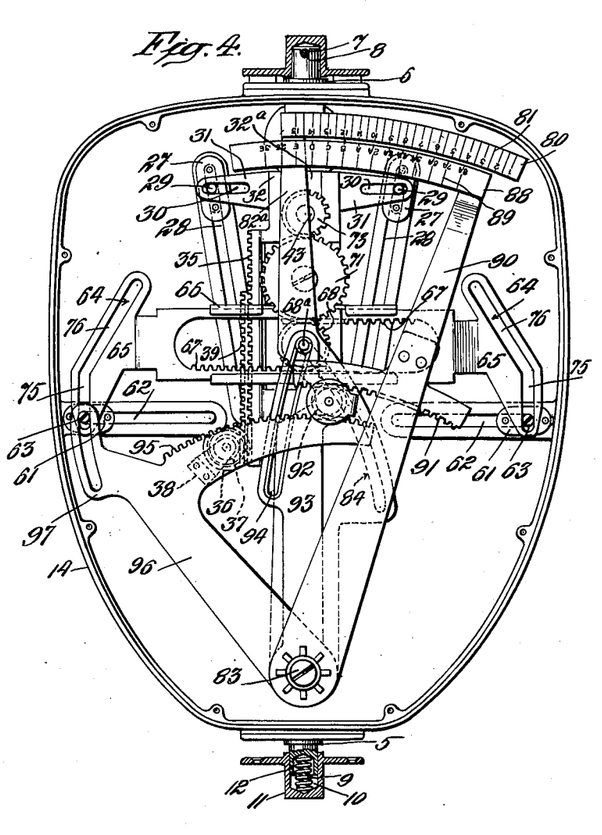
Fig. 4 is a top plan view of the measuring device with the top removed to show the operating mechanism in initial position.
Figure 5:
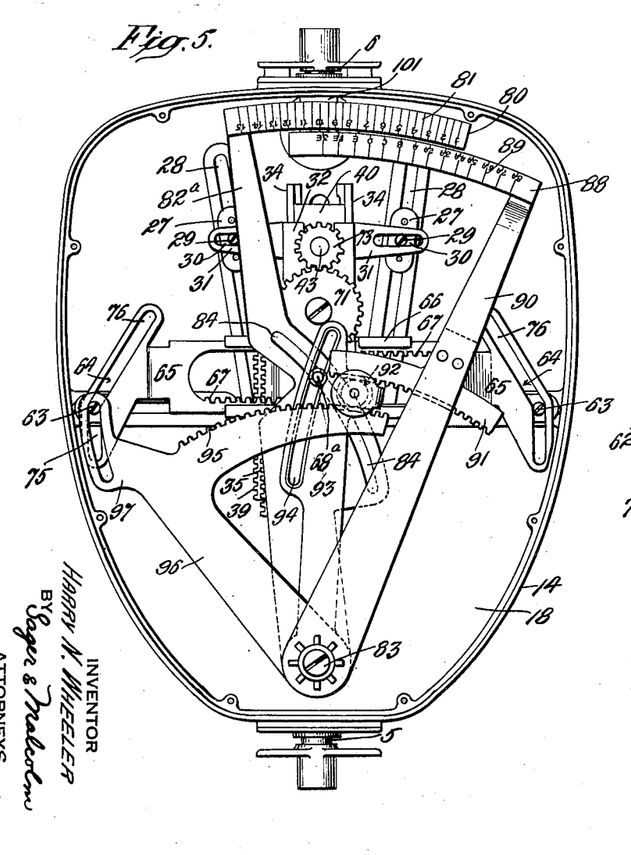
Fig. 5 is a view similar to Fig. 4 showing the mechanism adjusted to measure the length of the foot and before being adjusted to measure the width.

The slot 94 is designed to compensate for the movement of the width gage 60 during the length setting operation. For example, when the length gage is moved from it initial position corresponding to the length 15 as shown in Fig. 4, to an intermediate position corresponding to length 10, as shown in Fig. 5, the width gage 60 remains stationary due to the straight portion 75 of the slot 64 registering with the pin 63 at this time. It will be noted, however, that this width setting of the width gages 60 corresponds to a width "E" for the length 15 but corresponds to a width "3E" for the length 10. During this position of the adjustment the arm 96 and the rack 95 remain stationary. The slot 94 is so designed, however, that the arm 93 carrying the pinion 92 is shifted a distance adapted to shift the width indication on the scale 89 from "E" to "3E" as shown in Fig. 5.

When the length is still further reduced the pins 63 slide in the inclined portion 76 of the slot 64 and retract the width gages 60. As above pointed out the relationship is such that the width gages 60 assume a position corresponding to the width "3E" for the various length settings. Consequently the scale 89 should remain stationary during this portion of the setting. The shape of the slot 94 is accordingly designed so that the movement of the arm 93 and pinion 92 compensates for the movement of the rack 95, so that no change in setting of the width scale takes place.

Figure 6:
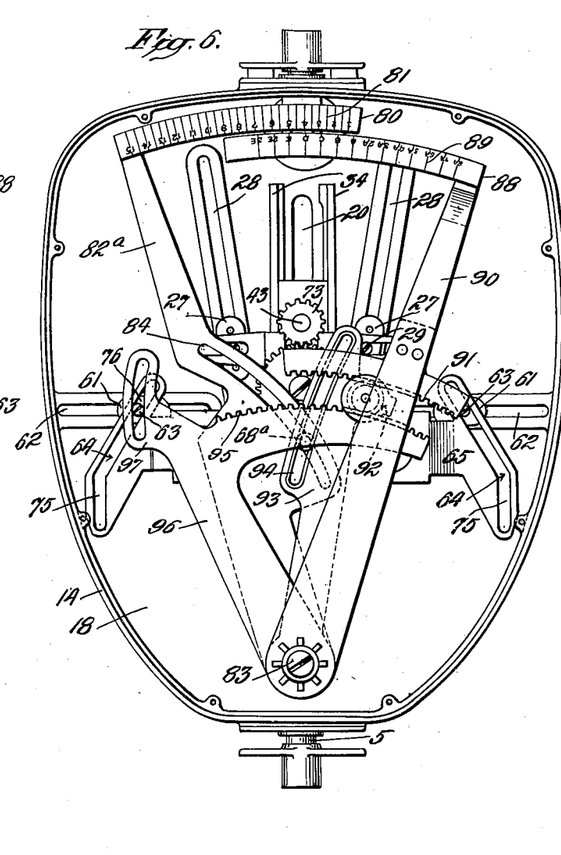
Fig. 6 is a similar view showing the mechanism adjusted to measure length and width.

After the length has been properly set by the means above described the width measurement is taken by rotating the handle 55 and thereby retracting the width gage plates 65. This causes a corresponding movement of the pins 63 and of the arm 96. This movement of the arm 96 is transferred through the rack 95 and pinion 92 to the rack 91 and causes a corresponding movement of the bracket 90 to cause the width index scale 89 to indicate the various settings of the width gages 60. In the example shown in Fig. 6 the toe gages 26 have been set to a length "4" and the width gages 60 have been set to a width "D". The designation "4D" will accordingly be visible through the apertures 82. This is the size of shoe corresponding to the above-mentioned foot measurements.

As a further feature of this device it has been found that in a normal foot the distance from the heel to the main joint of the large toe adjacent the balls of the feet is 17/24ths of the distance from the heel to the tips of the toes. Inasmuch as shoes are made to break at a point corresponding to the ball of the foot, it is evident that in the case of a foot having unusually short toes the proper shoe size will be determined by the ball of the foot rather than by the total length. The above-described mechanism permits this measurement to be taken. In making this measurement, with the foot placed upon the top plate 18, the center gage 19 is first shifted to a point such that the balls of the feet register with the recesses 22. The gage 19 is then locked in position by actuation of the set screw 24. The length measurement is now taken in the manner above described. If, however, the toes are unusually short the shoulder 50 of the slide 46 will engage the shoulder 51 of the gage 19 before the toe gages 26 have been brought into engagement with the tips of the toes. Further movement of the toe gages is accordingly prevented and the proper length is indicated by the corresponding setting of the machine, which would be somewhat longer than that obtained by measurement of the overall foot length. If desired, the gage 19 and slide 46 may be moved as a unit by insertion of the pin 54 in the manner above set forth. In this event the slide 46 and gage 19 would be moved downwardly in making the length measurement until either the recess 22 of the gage 19 registers with the balls of the feet or the toe gages 26 engage the tips of the toes. The handle 55 is then rotated to make the necessary width measurement in the manner above pointed out.

After the measurement has been taken the salesman or other attendant may release the catch 8 and swing the measuring machine about the pins 5 and 6 to bring the cover plate 15 into the upper position. The device thereupon serves as a foot rest for fitting on the shoes. At the same time the proper size is indicated by the scales which are visible through the aperture 32 and may be referred to during the fitting operation. When the device is to be used for making another measurement the catch 8 is released, the position of the machine is reversed, the mechanism is reset and the measuring operation may be repeated.

It will be noted that this invention combines a foot rest and measuring machine in a single unit in such a way that after the measurement has been taken the correct size is indicated by a scale which is visible on the foot rest. The invention accordingly provides a combined foot rest and size indicating device in a form which is convenient for the customer and for the salesman, and which forms a part of the salesman's stool.

The inward movement of the width gages when the length gages are being set not only maintains the maximum designated width for all sizes of feet but reduces the amount of adjustment required in taking the final width measurement.

The recesses 22 in the center gage 19 also provide means for determining the proper size shoe for a slightly abnormal foot in which the distance between the ball of the foot and the heel is greater than that of a standard foot. In such a case if the measurement were taken from the tips of the toes, the indicated size would be too small. By taking the measurement, however, when the recesses 22 register with the balls of the feet, even though the toe gage 26 does not quite engage the tips of the toes, the proper size designation is obtained.

Although a particular embodiment of the invention has been described for purposes of illustration, it will be evident that various modifications may be made therein as will appear to a person skilled in the art. Accordingly the invention is only to be limited in accordance with the following claims when interpreted in view of the prior art.

The invention claimed is:

1. A foot measuring device comprising a foot support, a ball gage movable longitudinally thereof and having means to register with the ball of the foot, a toe gage on said support movable to engage the forward extremity of the toes, and means controlled by said ball gage for limiting the movement of said toe gage.

2. A foot measuring device comprising a foot support, a ball gage movable longitudinally thereof and having means to register with the ball of the foot, a toe gage on said support movable to engage the forward extremity of the toes, an indicator actuated by said toe gage to indicate the length measurement of the foot, and means controlled by said ball gage for limiting the movement of said toe gage.

3. A foot measuring device comprising a foot support, a ball gage movable longitudinally thereof and having means to register with the ball of the foot, a toe gage on said support movable independently of said ball gage to engage the forward extremity of the toes, an indicator actuated by said toe gage to indicate the length measurement of the foot, means controlled by said ball gage for limiting the movement of said toe gage, and means for actuating said ball and toe gages in unison.

4. A foot measuring device comprising a foot support containing a longitudinal slot, a ball gage mounted for sliding movement in said slot and having means to register with the ball of the foot, a slide mounted in said slot, a toe gage on said support actuated by said slide to engage the forward extremity of the toes, means for indicating the length measurement of the foot corresponding to the position of said toe gage, and means on said ball gage for limiting the movement of said slide and said toe gage.

5. A foot measuring device comprising a foot support containing a longitudinal slot, a ball gage mounted for sliding movement in said slot and having means to register with the ball of the foot, a slide mounted in said slot, a toe gage on said support actuated by said slide to engage the forward extremity of the toes, means for indicating the length measurement of the foot corresponding to the position of said toe gage, means on said ball gage for limiting the movement of said slide and said toe gage, and means for connecting said ball gage and slide together to operate said ball and toe gages in unison.

6. A foot measuring device comprising a foot support containing a longitudinal track, a ball gage mounted for sliding movement in said track and having means to register with the ball of the foot, a slide mounted in said track, a toe gage on said support actuated by said slide to engage the forward extremity of the toes, said slide and said toe gage being arranged to move in a ratio corresponding to the relation between the total length of a normal foot and the distance between the ball and the heel of the foot, and means on said ball gage for limiting the movement of said slide and said toe gage.

7. A foot measuring device comprising a foot support, a ball gage movable longitudinally thereof and having means to register with the ball of the foot, a toe gage on said support movable to engage the forward extremity of the toes, means controlled by said ball gage for limiting the movement of said toe gage, a width gage actuated with said toe gage to maintain a definite relationship with respect thereto corresponding to a given shoe width, and means for actuating said width gage independently of said toe gage.

8. A foot measuring device comprising a foot support, a ball gage movable longitudinally thereof and having means to register with the ball of the foot, a toe gage movable in unison with said ball gage to engage the forward extremity of the toes, means controlled by said gages for indicating the correct length measurement of the foot, a width gage actuated with said toe gage to maintain a definite relationship with respect thereto corresponding to a given shoe width, and means for actuating said width gage independently of said toe gage.

9. A foot measuring device comprising a foot support, a toe gage movable to engage the toes for measuring the length of the feet, a width gage actuated with said toe gage to maintain a definite relationship with respect thereto corresponding to a given shoe width, means for actuating said toe and width gages, and means for independently actuating said width gage regardless of the position of said first-mentioned actuating means to measure the width of the feet.

10. A foot measuring device comprising a foot support, a toe gage movable to engage the toes for measuring the length of the feet, a slide carrying an operating handle, said slide being operatively connected to actuate said toe gage in response to sliding movement thereof, a width gage movable transversely of said support for measuring the width of the feet, means operatively connecting said width gage to said slide for maintaining a definite relationship between said width gage and said toe gage corresponding to given shoe widths at the various lengths, and means connecting said width gage to said handle for independent actuation to measure the foot width.

11. A foot measuring device comprising a platform to support the foot, a slide mounted on said platform and movable longitudinally thereof, a toe gage movable to engage the forward extremity of the toes for measuring the length of the foot, gears interconnecting said toe gage and said slide for causing movement of said toe gage upon actuation of said slide, said gears having a ratio such that the relative movement of said slide and toe gage corresponds to the ratio of the distance between the heel and the ball of the foot to the overall length of the normal foot.

12. A foot measuring device comprising a platform to support the foot, a slide mounted on said platform and movable longitudinally thereof, a toe gage movable to engage the forward extremity of the toes for measuring the length of the foot, gears interconnecting said toe gage and said slide for causing movement of said toe gage upon actuation of said slide, said gears having a ratio such that the relative movement of said slide and toe gage corresponds to the ratio of the distance between the heel and the ball of the foot to the overall length of the normal foot, a width gage movable transversely of said platform for measuring the width of the foot, means for actuating said width gage independently of said toe gage, and means associated with said slide to actuate said width gage with said toe gage to maintain a definite relationship between the width and length measurements.

13. A foot measuring device comprising a platform to support the foot, a slide mounted on said platform and movable longitudinally thereof, a toe gage movable to engage the forward extremity of the toes for measuring the length of the foot, means connecting said toe gage with said slide for causing corresponding movement thereof, a width gage mounted for transverse movement on said platform to measure the width of the foot, means movable with said toe gage for adjusting said width gage to given shoe widths at the various shoe lengths, and means for independently moving said width gage for measuring the width of the foot.

14. A foot measuring device comprising a platform to support the foot, a slide on said platform movable longitudinally thereof, a toe gage movable to engage the toes for measuring the length of the foot, gears connecting said toe gage with said slide for causing movement of said gage in a definite relationship to the movement of said slide, a width gage mounted for transverse movement on said platform for measuring the width of the foot, a gage plate carried by said slide having means for adjusting said width gage in a definite relationship to said toe gage as the slide is actuated, means associated with said gage plate for transverse adjustment, an operating handle rotatably mounted in said slide and movable therewith, and means operatively connecting said handle to said gage plate for causing adjustment of said width gage independent of said toe gage.

15. A foot measuring device comprising a foot support, a toe gage movable to engage the forward extremity of the toes for measuring the length of the foot, a scale actuated thereby to indicate the correct shoe length, a width gage actuated with said toe gage to maintain a definite relationship with respect thereto corresponding to a given shoe width, means for actuating said width and toe gages, additional means for independently actuating said width gage to measure the width of the foot, a width scale, and means for actuating said width scale to indicate the width measurement.

16. A foot measuring device comprising a foot support, length and width scales to designate the correct shoe size, a toe gage movable to measure the foot length, means actuating said length scale in accordance with the position of said toe gage, a width gage movable to measure the foot width, means for moving said width gage with said toe gage to maintain a definite relationship thereto corresponding to a given shoe width, and means for moving said width gage and said width scale independently of said toe gage for measuring and indicating the width of the feet.

17. A foot measuring device comprising a foot support, a toe gage movable to engage the forward extremity of the toes for measuring the length of the foot, a slide carrying an operating handle, said slide being operatively connected to actuate said toe gage in response to sliding movement thereof, a width gage movable transversely of said support for measuring the width of the foot, means operatively connecting said width gage to said slide for maintaining a definite relationship between said width gage and said toe gage corresponding to given shoe widths at the various shoe lengths, means connecting said width gage to said handle for independent actuation to measure the foot width, a length scale actuated by said slide to indicate the shoe length, and a width scale actuated by said handle to indicate the shoe width.

18. A foot measuring device comprising a platform to support the feet, a slide mounted on said platform and movable longitudinally thereof in a position between the feet, a pair of toe gages movable to engage the forward extremities of the toes for measuring the length of the feet, gears connecting said toe gages with said slide for causing movement of said toe gages in a definite relationship to the movement of said slide, a pair of width gages mounted for transverse movement on said platform to measure the width of the feet, gage plates interconnecting said width gages, an operating member rotatably mounted in said slide and movable therewith, said member being operatively connected to said gage plates for actuating the same to adjust said width gages, means associated with said slide to adjust said width gages to correspond to a given shoe width at the various lengths, a length index bracket pivoted to said platform, a pin carried by said slide and cooperating with a cam slot in said index bracket to actuate the same for designating the shoe length, a width index bracket pivoted to said platform, and means carried by said width gages to actuate said width index bracket for designating the shoe width.

19. A foot measuring device comprising a platform to support the feet, a slide mounted on said platform and movable longitudinally thereof in a position between the feet, a pair of toe gages movable to engage the forward extremities of the toes for measuring the length of the feet, gears connecting said toe gages with said slide for causing movement of said toe gages in a definite relationship to the movement of said slide, a pair of width gages mounted for transverse movement on said platform to measure the width of the feet, gage plates interconnecting said width gages, an operating member rotatably mounted in said slide and movable therewith, said member being operatively connected to said gage plates for actuating the same to adjust said width gages, means associated with said slide to adjust said width gages to correspond to a given shoe width at the various lengths, a length index bracket pivoted to said platform, a pin carried by said slide and cooperating with a cam slot in said index bracket to actuate the same for designating the shoe length, a width index bracket pivoted to said platform, means carried by said width gage to actuate said width index bracket for designating the shoe width, and means to prevent movement of said width index bracket in response to width adjustments caused by movement of said slide.

20. A foot measuring device comprising a platform to support the feet, a slide mounted on said platform and movable longitudinally thereof in a position between the feet, a pair of toe gages movable to engage the forward extremities of the toes for measuring the length of the feet, gears connecting said toe gages with said slide for causing movement of said toe gages in a definite relationship to the movement of said slide, a pair of width gages mounted for transverse movement on said platform to measure the width of the feet, gage plates interconnecting said width gages, an operating member rotatably mounted in said slide and movable therewith, said member being operatively connected to said gage plates for actuating the same to adjust said width gages, means associated with said slide to adjust said width gages to correspond to a given shoe width at the various lengths, a length index bracket pivoted to said platform, a pin carried by said slide and cooperating with a cam slot in said index bracket to actuate the same for designating the shoe length, a width index bracket pivoted to said platform, means carried by said width gage to actuate said width index bracket for designating the shoe width, and a third bracket pivoted to said platform carrying means to actuate said width index bracket, said third bracket having a slot cooperating with said pin to cause movement of said third bracket adapted to compensate for movement of said width gages caused by the length adjustment.

21. A foot measuring device comprising a platform to support the feet, a slide mounted on said platform and movable longitudinally thereof in a position between the feet, a pair of toe gages movable to engage the forward extremities of the toes for measuring the length of the feet, gears connecting said toe gages with said slide for causing movement of said toe gages in a definite relationship to the movement of said slide, a pair of width gages mounted for transverse movement on said platform to measure the width of the feet, gage plates interconnecting said width gages, an operating member rotatably mounted in said slide and movable therewith, said member being operatively connected to said gage plates for actuating the same to adjust said width gages, means associated with said slide to adjust said width gages to correspond to a given shoe width at the various lengths, a length index bracket pivoted to said platform, a pin carried by said slide and cooperating with a cam slot in said index bracket to actuate the same for designating the shoe length, a width index bracket pivoted to said platform, a rack carried by said last bracket, a second rack actuated by said width gage, a pinion interconnecting said racks to cause movement of said width index bracket corresponding to width adjustments, and a third bracket carrying said pinion and having a slot actuated by said pin to cause movement of said third bracket to compensate for movement of said second rack caused by the length adjustment.

HARRY N. WHEELER.